(12) United States Patent
Yoshigahara

(10) Patent No.: US 7,865,923 B2
(45) Date of Patent: Jan. 4, 2011

(54) INFORMATION RECEIVING APPARATUS AND CONTROL METHOD THEREOF

(75) Inventor: Noriyuki Yoshigahara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 604 days.

(21) Appl. No.: 11/877,277

(22) Filed: Oct. 23, 2007

(65) Prior Publication Data

US 2008/0104640 A1 May 1, 2008

(30) Foreign Application Priority Data

Oct. 27, 2006 (JP) .............................. 2006-293155

(51) Int. Cl.
*H04N 5/445* (2006.01)

(52) U.S. Cl. .............................. 725/54; 725/48; 725/49; 725/50

(58) Field of Classification Search ......... 725/105–106, 725/48–50, 54
See application file for complete search history.

(56) References Cited

FOREIGN PATENT DOCUMENTS

| JP | 11-205698 A | | 7/1999 |
|---|---|---|---|
| JP | 2005-051613 A | | 2/2005 |
| JP | 2005-051615 | * | 2/2005 |

OTHER PUBLICATIONS

English Translation by Human Translator of JPA 2005-051615 Submitted with Information Disclosure Statement Filed Apr. 19, 2010.

* cited by examiner

*Primary Examiner*—John W Miller
*Assistant Examiner*—Sumaiya A Chowdhury
(74) *Attorney, Agent, or Firm*—Cowan, Liebowitz & Latman, P.C.

(57) ABSTRACT

A channel selection order to receive, from each channel, program data corresponding to a designated partial period is determined based on the start timing of the reception and the receiving timing of each of N program data received for each channel. A channel is selected in accordance with the determined order, and program data transmitted from the broadcast device of the selected channel is received.

6 Claims, 9 Drawing Sheets

FIG. 3

|  | Ch.A | Ch.B | Ch.C | Ch.D | Ch.E |
|---|---|---|---|---|---|
| SEGMENT 01 |  |  |  |  |  |
| SEGMENT 02 |  |  |  | //// |  |
| SEGMENT 03 | //// |  |  |  |  |
| SEGMENT 04 |  |  |  |  | //// |
| SEGMENT 05 |  |  | //// |  |  |
| ⋮ | ⋮ | ⋮ | ⋮ | ⋮ | ⋮ |
| SEGMENT N | //// | //// |  | //// |  |

FIG. 4

| No. | CONTENTS | | | | |
|---|---|---|---|---|---|
| 01 | BROADCASTER: 01<br>TableID: 0x50, 0x51<br>SEGMENT: 01, 03, 04 | BROADCASTER: 05<br>TableID: 0x50, 0x51<br>SEGMENT: 01, 02, 03, 04 | BROADCASTER: 07<br>TableID: 0x50, 0x51<br>SEGMENT: 01, 03, 04 | ... | ... |
| 02 | BROADCASTER: 01<br>TableID: 0x58, 0x59<br>SEGMENT: 01~08 | BROADCASTER: 02<br>TableID: 0x58, 0x59<br>SEGMENT: 01~08 | BROADCASTER: 03<br>TableID: 0x58, 0x59<br>SEGMENT: 01~08 | ... | ... |
| 03 | BROADCASTER: 01<br>TableID: 0x50, 0x51<br>SEGMENT: 09~16 | BROADCASTER: 02<br>TableID: 0x50, 0x51<br>SEGMENT: 09~16 | BROADCASTER: 03<br>TableID: 0x50, 0x51<br>SEGMENT: 09~16 | ... | ... |
| 04 | BROADCASTER: 01<br>TableID: 0x50, 0x51<br>SEGMENT: 17~32 | BROADCASTER: 02<br>TableID: 0x50, 0x51<br>SEGMENT: 17~32 | BROADCASTER: 03<br>TableID: 0x50, 0x51<br>SEGMENT: 17~32 | ... | ... |
| ... | ... | ... | ... | ... | ... |

CELL

ACQUISITION-EXPECTED GROUP

FIG. 5A

| ACQUISITION ORDER | ACQUISITION TIME | SEGMENT |
|---|---|---|
| 1 | 0:00:03 | 21 |
| 2 | 0:00:05 | 22 |
| 3 | 0:00:09 | 23 |
| 4 | 0:00:11 | 24 |
| 5 | 0:00:13 | 25 |
| ⋮ | ⋮ | ⋮ |
| 64 | 0:00:59 | 4 |

FIG. 5B

| TIMING VALUE | SEGMENT |
|---|---|
| 3 | 21 |
| 5 | 22 |
| 9 | 23 |
| 11 | 24 |
| 13 | 25 |
| ⋮ | ⋮ |
| 59 | 4 |

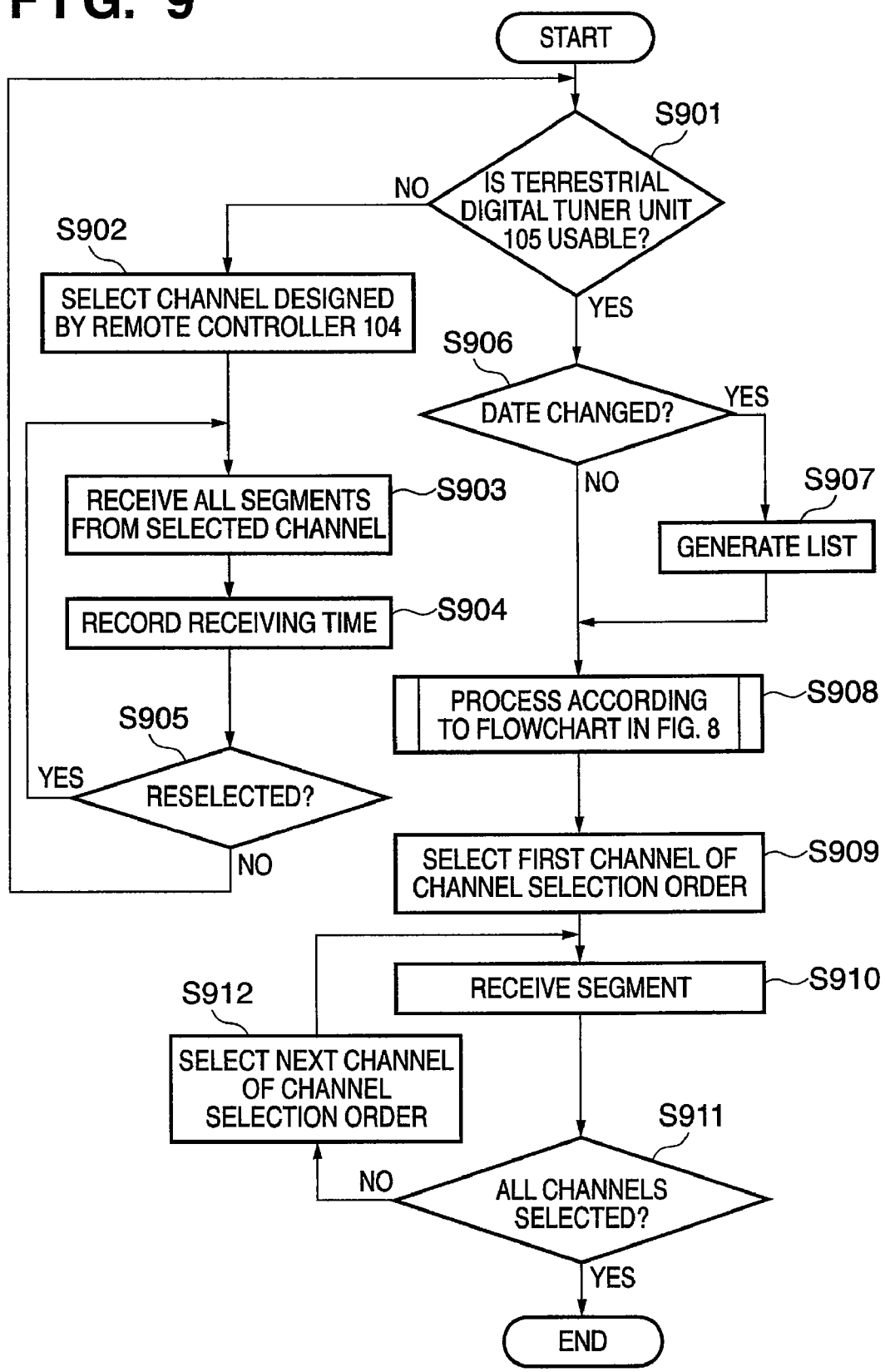

INFORMATION RECEIVING APPARATUS AND CONTROL METHOD THEREOF

BACKGROUND OF THE INVENTION

1. Field of the Invention

The present invention relates to a technique of receiving information about a program.

2. Description of the Related Art

It is recently a common practice to impart an EPG (Electronic Program Guide) function to a PDR (Personal Digital Recorder) such as a TV set or HDD recorder. To use an EPG, program information transmitted by radio broadcast is received, or program information is received via the Internet. The form of transmitting program information by radio broadcast is roughly classified into two types. One form uses analog broadcasting, and the other form uses digital broadcasting.

An EPG sent using digital broadcasting will be described. Digital broadcasting uses MPEG2-TS (Transport Stream) as a protocol independent of the transmission scheme. In MPEG2-TS, program data such as PSI (Program Specific Information) and SI (Service Information) are multiplexed, in addition to video data and audio data. The PSI contains contents to be transmitted by the TS and control information such as information to decode information contained in the contents and information for scrambling. The SI is an extended information group containing transmission control signals not including the PSI. The ARIB—(Association of Radio Industries and Business) that has standardized digital broadcasting in Japan defines various kinds of information contained in SI.

To generate an EPG, an EIT (Event Information Table) contained in SI is mainly used. An EIT describes items of information about a program such as a program title, broadcast date/time, program length, cast, and explanation of program contents in correspondence with predetermined descriptors.

Terrestrial digital broadcasting defines that all receivable broadcasters are selected, and PSI/SI is acquired and stored even while the receiver has been powered off. That is, to generate the EPG information of all receivable broadcasters, it is necessary to control the tuner and receive a radio broadcast from each broadcaster. A time of about 1 minute is required for acquiring PSI/SI of seven days, which is periodically transmitted from one broadcaster. If there 10 channels as EPG generation targets, a time of about 10 minutes is required for acquiring the PSI/SI of all channels.

In a conventionally employed program data acquisition method, a control unit for controlling a tuner controls a tuner on the basis of an instruction from a program table control unit, thereby acquiring broadcast data corresponding to a designated broadcaster. Program data is extracted by demultiplexing the broadcast data received by the tuner. The extracted program data is saved in an arbitrary memory area.

A tuner use determination unit for determining the usage state of the tuner is provided. The tuner use determination unit determines whether the user is executing the broadcast receiving function, or there is a program to be recorded or watched in the time required for acquiring predetermined program data. This determination process is executed to determine whether the tuner is usable for the program data acquisition process.

FIG. 7 is a flowchart illustrating the conventional program data acquisition process. An arbitrary control unit for performing program data acquisition executes the process according to the flowchart in FIG. 7.

In step S1101, it is determined whether a predetermined period has elapsed from the date/time of the previous program data acquisition. If it is determined that the predetermined period has elapsed, the process advances to step S1102. If it is determined that the predetermined period has not elapsed, the process is terminated.

When the predetermined period has elapsed, several channels do not have all program data in a predetermined range (e.g., seven days from the current time). In step S1102, an unacquired broadcaster list indicating channels which have not acquired all program data in the predetermined range is created. The unacquired broadcaster list is list data that associates an arbitrarily determined acquisition order with broadcasters (channels).

In step S1103, it is determined whether the tuner is usable for program data acquisition. If it is determined that the tuner is usable, the process advances to step S1104. If the tuner is unusable, the process advances to step S1109. For example, if it is impossible to freely control the tuner because the user is watching a program, the process advances to step S1109. On the other hand, if it is determined that the tuner can freely be controlled in a predetermined period, the process advances to step S1104.

In step S1104, the tuner is controlled to select a broadcaster (channel) described in the unacquired broadcaster list created in step S1102. The list defines a channel selection order based on an arbitrary condition. Hence, channel selection is done from the broadcaster (channel) with the highest priority.

In step S1105, program data is acquired from the broadcast data of the selected channel and saved in an arbitrary memory area, as described above. In step S1106, it is determined whether all program data have been received from the selected channel. If all program data have not been received, the process returns to step S1105 to continue the process in step S1105. If all program data have been received, the process advances to step S1107.

In step S1107, the broadcaster whose program data are completely acquired is excluded from the unacquired broadcaster list. In step S1108, it is determined by referring to the unacquired broadcaster list whether a broadcaster whose program data is unacquired exists. If it is determined that such a broadcaster does not exist, the process is terminated. If such a broadcaster exists, the process returns to step S1104 to execute the subsequent process for the broadcaster whose program data is unacquired.

If it is determined in the determination process in step S1103 that the tuner cannot freely be controlled, the process advances to step S1109, as described above. The state wherein the tuner is unusable indicates that the tuner is currently being used, or the tuner is to be used in a predetermined period. In step S1109, it is determined whether the broadcaster (channel) to be selected by the tuner that is currently being used or is to be used after a predetermined period has elapsed is described in the unacquired broadcaster list.

If it is determined that the broadcaster (channel) is not described, the process is terminated. If the broadcaster (channel) is described, the process advances to step S1110. In step S1110, program data is acquired from the broadcast data of the broadcaster (channel) to be selected by the tuner that is currently being used or is to be used after the elapse of a predetermined period, and saved in an arbitrary memory area, as in step S1105.

In step S1111, it is determined whether all program data have been received from the currently selected channel. If all program data have not been received, the process returns to step S1110 to continue the process in step S1110. If all program data have been received, the process advances to step S1112. In step S1112, the currently selected broadcaster is excluded from the unacquired broadcaster list.

It is determined next whether the user has executed the channel selection operation. If the user has not executed the operation, the process is terminated. If the user has executed the operation, the process returns to step S1109 to execute the subsequent process for the channel selected by the user.

As described above, in the conventional program data acquisition process, it is determined by using, for example, a list whether the program data of all receivable channels in a predetermined range has been acquired. As described above, when the user starts using the tuner, PSI/SI acquisition is interrupted. This inhibits efficient program information acquisition. It is therefore impossible to quickly generate and present an EPG screen for the user.

To solve these problems, for example, Japanese Patent Laid-Open No. 2005-051615 is disclosed. Japanese Patent Laid-Open No. 2005-051615 discloses a receiver which records and manages, in a program information acquisition time table, the acquisition time information of program information acquired for each segment.

A segment is a unit for dividing one day into predetermined time periods. For example, when one segment corresponds to 3 hours, one day (24 hours) can be defined by 8 segments. This receiver creates a channel selection priority order table at the time of automatic program information acquisition after power off by referring to the program information acquisition time table and determining the necessity of channel selection or channel selection priority order. A program information acquisition unit selects a channel in accordance with the information of the created channel selection priority order table and acquires program information. That is, the receiver disclosed in Japanese Patent Laid-Open No. 2005-051615 stores a segment whose program information is unacquired. As soon as the acquisition is ended, another channel is selected, thereby acquiring program information in a short time.

In Japanese Patent Laid-Open No. 2005-051615 described above, unacquired segments of program information transmitted from a plurality of broadcasters are stored so that only necessary segments are acquired. In this manner, the time can be shortened. In using this method, however, after the segment of one broadcaster is acquired, the next broadcaster is selected. For this reason, the time required until acquisition of a target segment is not always shortened.

The channel selection priority order for program information acquisition is determined by giving the highest priority to acquisition of program information close to the current time. However, the desired program information has not always been transmitted at the time of channel selection. As a result, the time required for acquiring all items of necessary program information may not be shortened.

SUMMARY OF THE INVENTION

The present invention has been made to solve the above-described problems, and has as its object to provide a technique of shortening the time required for acquiring desired program data when program data necessary for EPG creation is to be acquired for each channel.

According to one aspect of the present invention, there is provided an information receiving apparatus capable of receiving program data transmitted from every broadcast device when a predetermined period is divided into N (N≧2) partial periods, and a broadcast device is provided for each channel and periodically transmits, as program data, N items of information about at least one program broadcast by one channel within the partial period, comprising: a receiving unit configured to execute a process of receiving N program data from a broadcast device of a selected channel and recording receiving timing information representing a receiving timing of each received program data in a memory for each channel; a determination unit configured to determine a channel selection order to receive, from each channel, program data corresponding to a designated partial period on the basis of a start timing of the reception and the receiving timing information of each of the N program data received for each channel; and a receiving control unit configured to receive program data transmitted from the broadcast device of a channel selected in accordance with the order determined by the determination unit.

According to another aspect of the present invention, there is provided a control method of an information receiving apparatus capable of receiving program data transmitted from every broadcast device when a predetermined period is divided into N (N≧2) partial periods, and a broadcast device is provided for each channel and periodically transmits, as program data, N items of information about at least one program broadcast by one channel within the partial period, comprising the steps of: executing a process of receiving N program data from a broadcast device of a selected channel and recording receiving timing information representing a receiving timing of each received program data in a memory for each channel; determining a channel selection order to receive, from each channel, program data corresponding to a designated partial period on the basis of a start timing of the reception and the receiving timing information of each of the N program data received for each channel; and receiving program data transmitted from the broadcast device of a channel selected in accordance with the order determined in the determining step.

According to still another aspect of the present invention, there is provided an information receiving apparatus capable of receiving program data periodically transmitted by a segment unit for each channel of digital broadcasting, comprising: a storage unit configured to store receiving timing information representing a receiving timing of each segment of program data of each channel; a determination unit configured to determine, on the basis of a start timing of acquisition and the receiving timing information, a channel selection order and a time schedule to acquire program data corresponding to a segment of interest by selecting a plurality of channels; and a receiving unit configured to receive program data transmitted by the channel selected in accordance with the order and time schedule determined by the determination unit.

According to yet another aspect of the present invention, there is provided a control method of an information receiving apparatus capable of receiving program data periodically transmitted by a segment unit for each channel of digital broadcasting, comprising the steps of: storing receiving timing information representing a receiving timing of each segment of program data of each channel; determining, on the basis of a start timing of acquisition and the receiving timing information, a channel selection order and a time schedule to acquire program data corresponding to a segment of interest by selecting a plurality of channels; and receiving program data transmitted by the channel selected in accordance with the order and time schedule determined in the determining step.

Further features of the present invention will become apparent from the following description of exemplary embodiments with reference to the attached drawings.

BRIEF DESCRIPTION OF THE DRAWINGS

FIG. 3 is a view showing a management configuration example of program data managed by a program data management unit 201;

FIG. 4 is a view showing a configuration example of a list in which segment groups to be acquired within an acquisition requiring time range are registered in the order of acquisition priority;

FIG. 5A is a view showing a configuration example of a table which registers information about each of the program data of 64 segments transmitted from one channel;

FIG. 5B is a view showing a configuration example of a timing value table which is generated by using the table shown in FIG. 5A when a transmitting interval T=1 min;

FIG. 9 is a flowchart illustrating an overall process executed by the broadcast receiving apparatus 100.

DESCRIPTION OF THE EMBODIMENTS

Preferred embodiments of the present invention will be described below in detail with reference to the accompanying drawings.

First Embodiment

Figure 1:
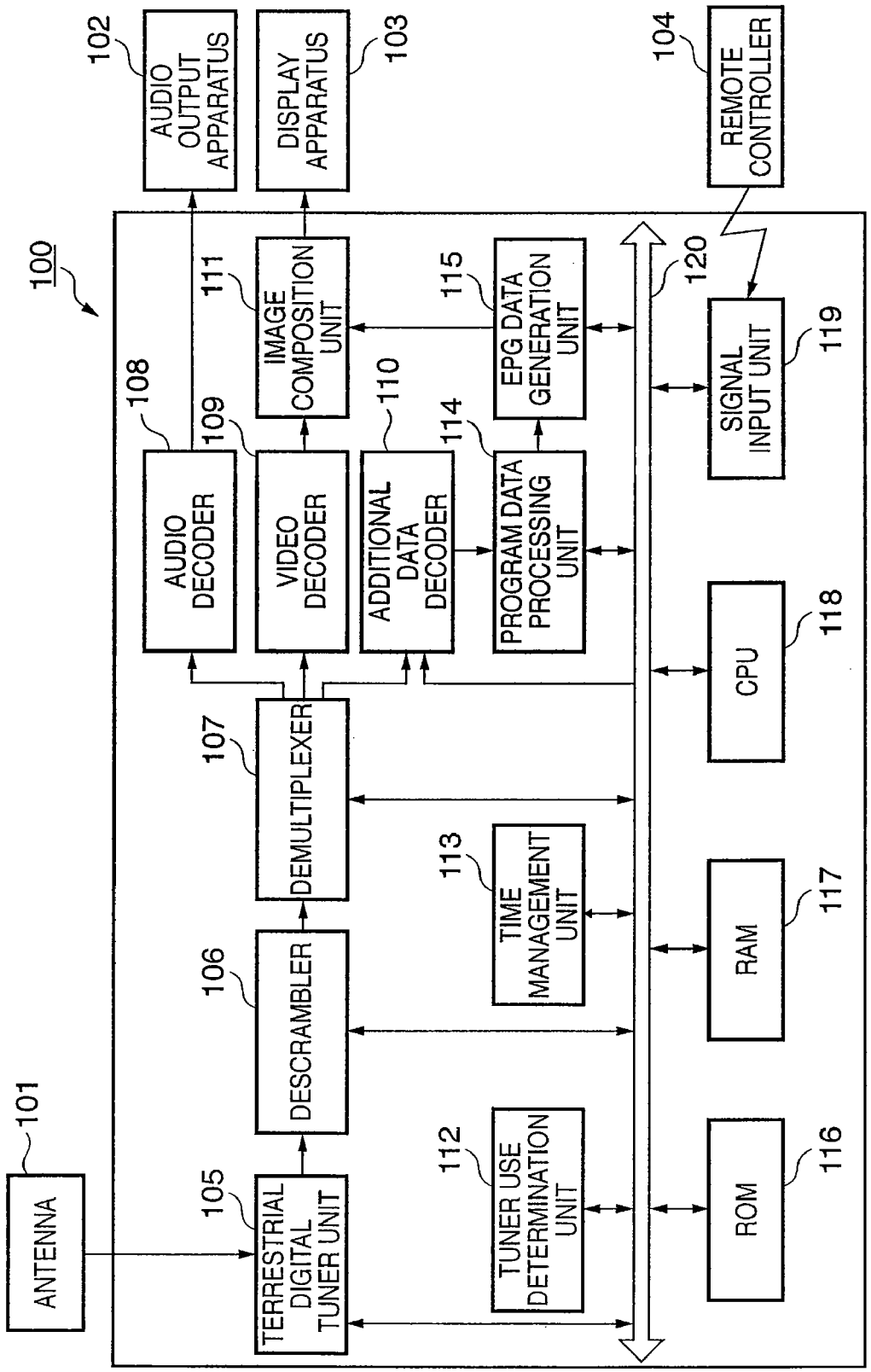
FIG. 1 is a block diagram showing the hardware configuration of a broadcast receiving apparatus 100 according to the first embodiment of the present invention.

FIG. 1 is a block diagram showing the hardware configuration of a broadcast receiving apparatus 100 according to this embodiment. As shown in FIG. 1, the broadcast receiving apparatus 100 of this embodiment receives a radio broadcast via an antenna 101 and obtains video data and audio data from the received radio broadcast. The video data is output to a display apparatus 103 as a video signal. The audio data is output to an audio output apparatus 102 as an audio signal.

Note that the broadcast receiving apparatus 100 of this embodiment is an apparatus (STB (Set Top Box) apparatus) independent of the display apparatus 103 and audio output apparatus 102, as shown in FIG. 1. However, the present invention is not limited to this. The broadcast receiving apparatus 100, display apparatus 103, and audio output apparatus 102 may be stored in a single enclosure to form, for example, a TV set. Alternatively, the broadcast receiving apparatus 100 and display apparatus 103 may be stored in one enclosure, whereas only the audio output apparatus 102 is stored in another enclosure. That is, methods for storing the three apparatuses as well as enclosure types are not particularly limited.

First, units included in the broadcast receiving apparatus 100 will be described.

A remote controller 104 has a plurality of buttons. The user operates the button group to execute operation input corresponding to the operated buttons. The operation input is sent, as a radio signal (operation signal) such as infrared light, to a signal input unit 119 provided in the broadcast receiving apparatus 100.

The operation signal input to the signal input unit 119 is input to a CPU 118 serving as a control unit via a bus 120. The CPU 118 analyzes the operation signal and controls the operations of the respective units included in the broadcast receiving apparatus 100 or some of them. For example, when the user inputs a channel selection designation by using the remote controller 104, a signal representing the contents of the channel selection designation is input to the CPU 118 via the signal input unit 119 and bus 120. The CPU 118 transmits the channel selection designation to a terrestrial digital tuner unit 105 via the bus 120 to select the channel designated by the user.

The terrestrial digital tuner unit 105 selects the channel designated by the user. The terrestrial digital tuner unit 105 receives, via the antenna 101, a terrestrial digital radio broadcast transmitted from the broadcast device of the selected channel. The received digital radio broadcast (the radio waveform of the frequency of the selected channel) is demodulated to a digital signal. The terrestrial digital tuner unit 105 also executes an error correction process for the demodulated signal.

In digital broadcasting, the digital signal demodulated by the terrestrial digital tuner unit 105 is an MPEG2-TS. In the following explanation, the terrestrial digital tuner unit 105 is assumed to be a tuner unit capable of receiving a terrestrial digital broadcast and demodulating it. However, the following description is applicable not only to terrestrial digital broadcasts but also to any other digital broadcast such as BS digital broadcasting or CS digital broadcasting. The following description is applicable to a system which causes a broadcaster itself to multiplex and transmit program information and a technique of processing program information transmitted by each broadcaster, as will be described later in detail. The terrestrial digital tuner unit 105 includes a single tuner unit. However, it may include a plurality of tuner units.

The MPEG2-TS demodulated by the terrestrial digital tuner unit 105 is input to a descrambler 106. The descrambler 106 descrambles the received MPEG2-TS (MPEG2-TS that is scrambled and transmitted) to a normal signal. The MPEG2-TS descrambled by the descrambler 106 is input to a demultiplexer 107.

The demultiplexer 107 demultiplexes the TS in which a plurality of streams of, for example, video and audio data are multiplexed by the transmitting-side multiplexer into stream data of, for example, video and audio data and section data such as SI and PSI. Each data demultiplexed by the demultiplexer 107 is input to a corresponding decoder.

More specifically, an audio PES (Packetized Elementary Stream) demultiplexed by the demultiplexer 107 is input to an audio decoder 108. The audio decoder 108 decodes the audio PES, thereby generating audio data. The audio data is sent to the above-described audio output apparatus 102. The audio output apparatus 102 converts the audio data from digital data to analog data and outputs it as an audio signal.

A video PES demultiplexed by the demultiplexer 107 is input to a video decoder 109. The video decoder 109 decodes the video PES, thereby generating video data. The video data is input to an image composition unit 111 (to be described later).

An additional data decoder 110 (also called a system decoder) decodes section data such as PSI or SI contained in the MPEG2-TS. The decoded program data such as PSI or SI is input to a program data processing unit 114.

The program data processing unit 114 stores the received program data in a RAM 117. The program data processing unit 114 also outputs the program data to an EPG data generation unit 115. The program data processing unit 114 will be described later in detail.

The EPG data generation unit 115 generates EPG data by laying out and rendering graphic data in accordance with an instruction from the program data processing unit 114. The generated EPG data is output to the image composition unit 111.

The image composition unit 111 generates a composite window obtained by composing a window based on the EPG data on a window based on the video data from the video decoder 109 and outputs the generated composite window to the display apparatus 103. The display apparatus 103 displays the generated composite window.

A tuner use determination unit 112 determines whether the terrestrial digital tuner unit 105 is usable for a program data acquisition process. The tuner use determination unit 112 determines whether the user is executing the broadcast receiving function, or there is a program to be watched or recorded in the time necessary for acquiring predetermined program data. This process enables to determine whether the terrestrial digital tuner unit 105 is usable for the program data acquisition process.

A time management unit 113 manages the arrival time (receiving time) of program data (segment information).

Figure 2:
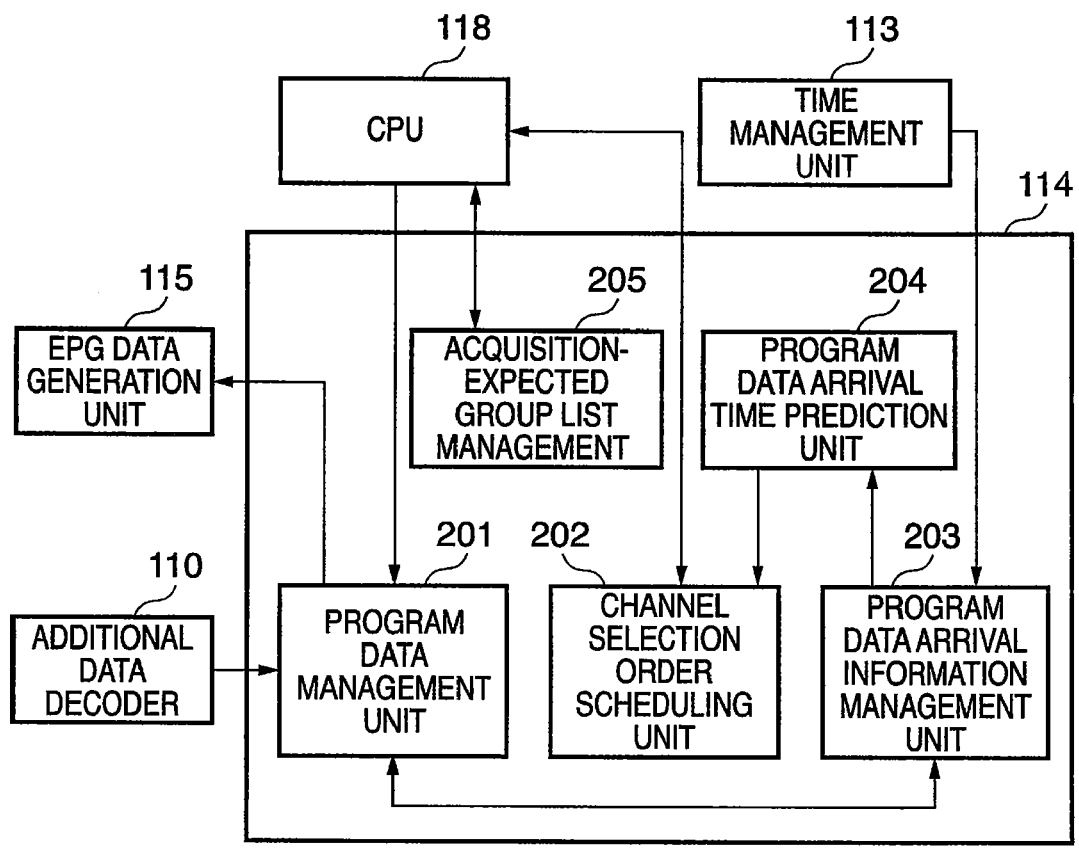
FIG. 2 is a block diagram showing the functional arrangement of a program data processing unit 114.

FIG. 2 is a block diagram showing the functional arrangement of the program data processing unit 114.

Program data such as SI or PSI input from the additional data decoder 110 is input to a program data management unit 201. The program data management unit 201 stores the received program data in the RAM 117 or a memory held by the program data management unit 201 itself.

FIG. 3 is a view showing a management configuration example of program data managed by the program data management unit 201. Referring to FIG. 3, the program data management unit 201 can manage the program data of segments (segments 01 to N) in correspondence with each of channels A (Ch.A) to E (Ch.E). The program data of segments corresponding to shaded parts are not acquired yet. That is, the program data is not registered.

The above-described ARIB standard defines 3 hours as one segment. Items of program information corresponding to 3 hours are transmitted together as one segment. In terms of implementation, segment 01 corresponds to 0:00 to 3:00 of a day, segment 02 corresponds to 3:00 to 6:00, and segment 64 corresponds to 21:00 to 24:00 of the day a week after.

For descriptive convenience, assume that the broadcast device of a channel periodically transmits the program data of 64 segments in an order unique to the channel at a start timing unique to the channel. The number of segments is not limited to 64.

FIG. 3 schematically shows a "table to manage the program data of each segment". In practice, it is necessary to generate the table in FIG. 3 for each of basic program information and extended program information (each information will be described later in detail) contained in program data.

Referring back to FIG. 2, under the control of the CPU 118, an acquisition-expected group list management unit 205 lists segment groups to be acquired within time range as an acquisition target in the order of acquisition and manages the list on the basis of the acquired segments managed by the program data management unit 201. The managed list can be stored in the RAM 117 or a memory prepared by the acquisition-expected group list management unit 205 itself.

The "time range as an acquisition target" is information representing the time range of the program table indicated by the EPG and is registered in a ROM 116 in advance. For example, if the time range of the program table indicated by the EPG is eight days from the current time, the "time range as an acquisition target" is a period "from the current fixed time to a fixed time eight days after".

FIG. 4 is a view showing a configuration example of a list in which segment groups to be acquired within the time range as an acquisition target are registered in the order of acquisition priority. As described above, the list is held in the RAM 117 or a memory prepared in the acquisition-expected group list management unit 205 and managed by the acquisition-expected group list management unit 205.

This list is used to manage basic program information and extended program information in segments that must be acquired at the current time. The list has cells and groups.

In each cell, for given broadcaster (channel), the types of program information to be acquired and a broadcast time period are registered. A type of program information is described as Table ID. A broadcast time period is described as a segment. Table ID is a term defined by the above-described ARIB standard. Table ID is an ID which is used to filter various kinds of program information. For example, 0x50 or 0x51 is defined as an ID of basic program information in terms of implementation. Basic program information contains, for example, a program title and broadcast time. Additionally, 0x58 or 0x59 is defined as an ID of extended program information. Extended program information contains, for example, cast information about a program.

A group is formed from one or a plurality of cells. There are a plurality of groups, each of which is defined by a predetermined rule. In FIG. 4, group No. 01 indicates a group which acquires the basic program information of segments Nos. 01 to 04 of each broadcaster. Group No. 02 indicates a group which acquires the extended program information of segments Nos. 01 to 08 of each broadcaster.

Note that the groups are numbered in descending order of priorities of program information acquisition. In the example shown in FIG. 4, there is a rule that the highest priority should be given to acquisition of information of the cells defined in group No. 01. However, the program information acquisition order is not limited to this.

As described above, the list is generated by listing the groups of program data to be acquired within time range as an acquisition target in the order of acquisition priority based on acquired program data managed by the program data management unit 201. The group list may be generated such that program data should newly be acquired even for programs with already acquired data. This is because contents of a program acquired in the past changes for reasons of the broadcaster or the extended program information is replaced with a more specific one as the broadcast day approaches. It is preferable to acquire new information any time even for segments acquired already, if considering the user's convenience.

In this embodiment, a case will be described, in which "program data of basic program information of all segments (i.e., 64 segments) within time range as an acquisition target" are acquired for each channel independently of the presence/absence of an acquired segment. In the following explanation, program data of basic program information is acquired as program data, unless otherwise specified.

For "program data of basic program information of all segments within time range as an acquisition target", which are transmitted from the broadcast device of each channel, a program data arrival information management unit 203 stores, for each channel, the receiving timings, the names of received segments, and Table IDs of the program data of segments received for the channel in the RAM 117 or a memory prepared by the program data arrival information management unit 203 as table data, and manages the table data.

The operation of the program data arrival information management unit 203 will be described in more detail. When a channel selection designation without any specific order (to be described later) or a channel selection order change instruction is input from the remote controller 104, the terrestrial digital tuner unit 105 selects an appropriate channel. After this selection, the program data of 64 segments sequentially transmitted from the broadcast device of the selected channel are received. This reception is done by controlling the terrestrial digital tuner unit 105, descrambler 106, demultiplexer 107, and additional data decoder 110, as described above.

The time management unit 113 counts and manages each program data receiving time. The program data arrival information management unit 203 stores the receiving time of each received program data in association with a segment name and Table ID contained in the program data. This allows management of a set of a segment name, Table ID, and receiving time for the program data of each of the 64 segments.

FIG. 5A is a view showing a configuration example of a table which registers information about each of the program data of 64 segments transmitted from one channel.

In the table shown in FIG. 5A, the "acquisition order" indicates the receiving order of the program data of each segment. The "acquisition time" indicates the acquisition (receiving) time of each program data. The "segment" indicates an identifier unique to a segment corresponding to each program data and is contained in the program data of each segment.

In the above-described way, the program data of 64 segments transmitted from the broadcast device of the first selected channel are received, and the acquisition time and the like of each program data are managed. The table configuration is not particularly limited as long as the above-described purpose can be achieved.

When the program data of 64 segments are received from the broadcast device of the currently selected channel, and a table corresponding to the program data of 64 segments is generated, the terrestrial digital tuner unit 105 selects an unselected channel and executes the same process as described above. That is, the program data of 64 segments are received from the broadcast device of the channel, and a table corresponding to the program data of 64 segments is generated.

A predetermined period is (e.g., equally) divided into N (N≧2) partial periods. A broadcast device is provided for each channel and periodically transmits, as program data, N items of information about at least one program broadcast by the channel within the partial period. In this case, the broadcast receiving apparatus 100 executes a process of receiving the program data of N segments from the broadcast device of a selected channel and recording the receiving timing of each received program data in a memory such as the RAM 117 for each channel.

Figure 6:
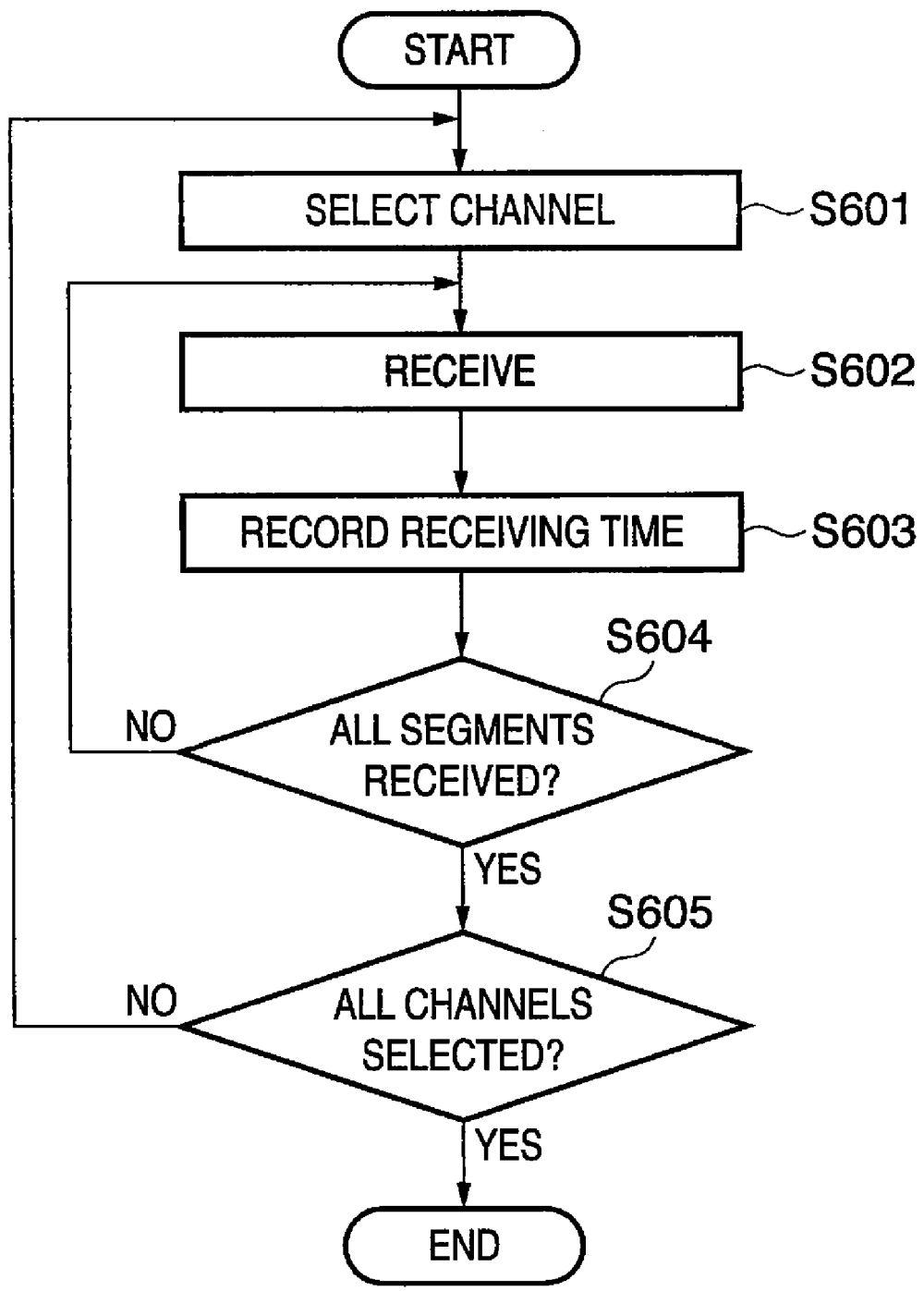
FIG. 6 is a flowchart illustrating a process of receiving the program data of 64 segments for each channel and recording the receiving timing of each item of program data.
Figure 7:
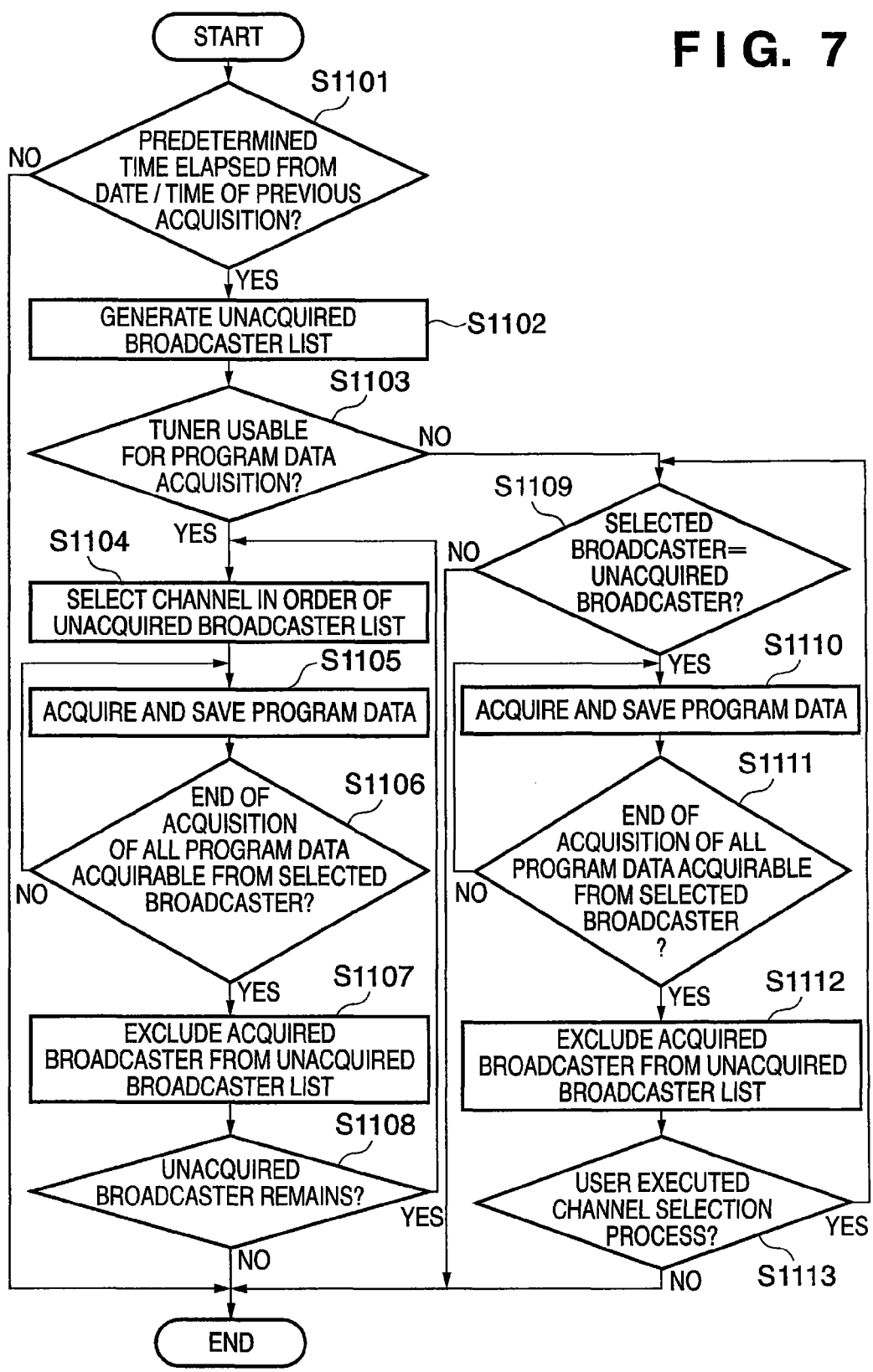
FIG. 7 is a flowchart illustrating a conventional program data acquisition process.

FIG. 6 is a flowchart illustrating a process of receiving the program data of 64 segments for each channel and recording the receiving timing of each program data. The process according to the flowchart in FIG. 6 and processes according to other flowcharts described-below are performed when a program or data held in the ROM 116 or the memory of a functional unit for executing the steps to be described later is executed by the CPU 118 or the corresponding functional unit.

First in step S601, the CPU 118 controls the terrestrial digital tuner unit 105 to select an appropriate channel. The terrestrial digital tuner unit 105 selects an appropriate channel designated by the CPU 118. Thus, the terrestrial digital tuner unit 105 can receive the program data of segments transmitted from the broadcast device of the selected channel.

In step S602, the terrestrial digital tuner unit 105 receives the program data transmitted from the broadcast device of the selected channel. The received program data is stored in the RAM 117 or a memory in the program data management unit 201, as described above.

In step S603, the receiving time of the program data received in step S602 is recorded in association with a segment name and Table ID contained in the received program data. That is, a table as shown in FIG. 5A is generated.

In step S604, it is checked whether the program data of 64 segments are received from the broadcast device of the currently selected channel. If it is determined by the check that program data of 64 segments are not received yet, the process returns to step S602. The process in steps S602 and S603 is repeated until the program data of 64 segments are received.

If the program data of 64 segments are received, process advances to step S605. In step S605, it is checked whether all channels are selected, that is, whether an unselected channel remains. If it is determined by the check that all channels are selected, the process is ended. If an unselected channel exists, the process returns to step S601 to select an unselected channel and repeat the subsequent process.

Referring back to FIG. 2, a channel selection order scheduling unit 202 operates under the control of the CPU 118. The channel selection order scheduling unit 202 executes a process (scheduling process) of determining the channel selection order for the next reception of program data of 64 segments from each channel.

Figure 8:
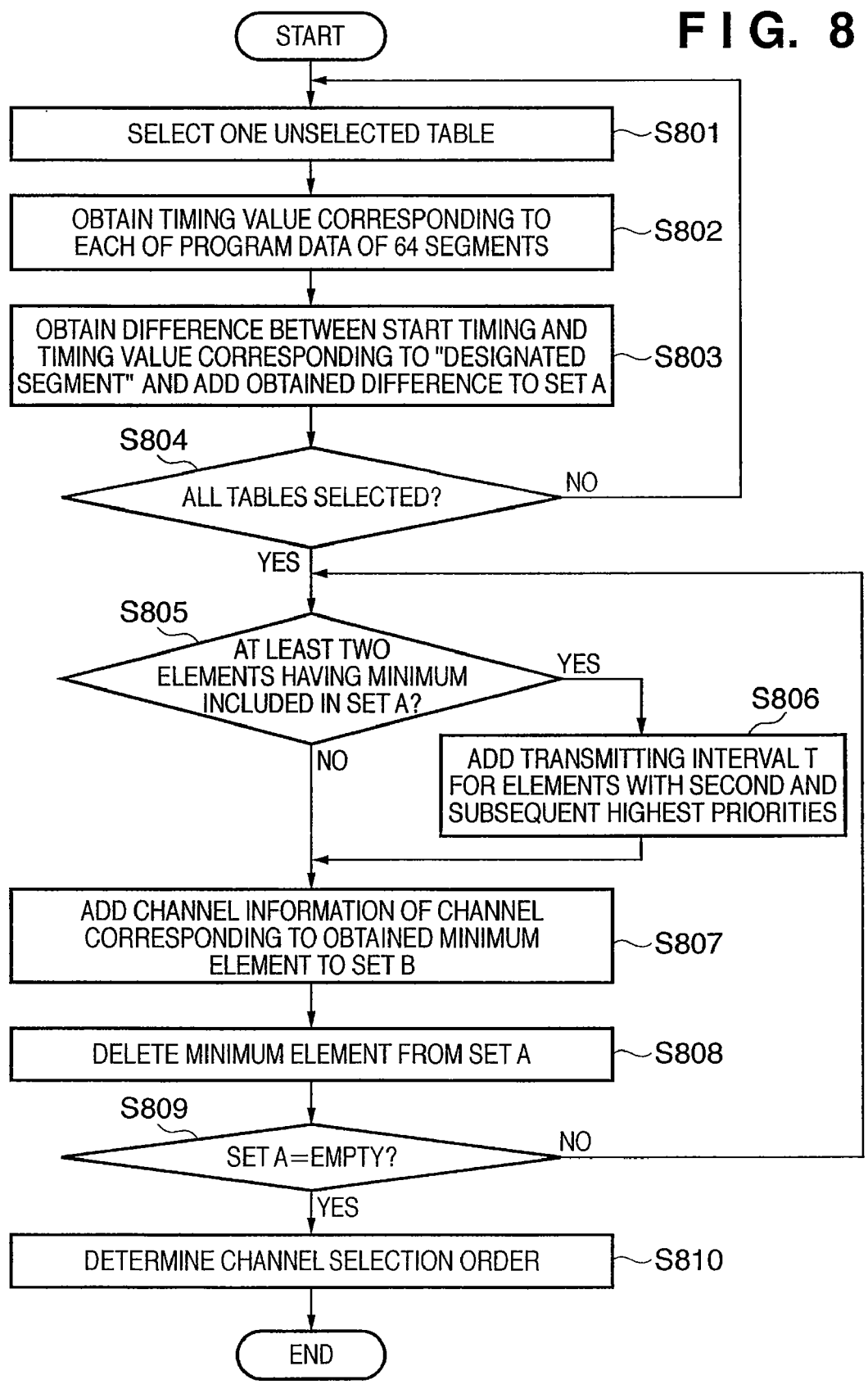
FIG. 8 is a flowchart illustrating a process of causing a channel selection order scheduling unit 202 to determine a channel selection order.

FIG. 8 is a flowchart illustrating a process of causing the channel selection order scheduling unit 202 to determine a channel selection order.

In step S801, a table which is not yet selected for the process to be described below is selected from tables as shown in FIG. 5A which are generated for the respective channels.

In step S802, a timing value corresponding to each acquisition time registered in the table (to be referred to as a selected table hereinafter) selected in step S801 is obtained. More specifically, the timing value is obtained by using an acquisition time registered in the selected table and a transmitting interval at which the broadcast device of the channel corresponding to the selected table transmits the program data of 64 segments. This process will be described in more detail.

Let t be the acquisition time of given program data, and T be the transmitting interval. The remainder of t/T is a timing value r corresponding to the program data. For example, when the acquisition time t is "0:00:03" and the transmitting interval T is 1 min, the timing value r is "3". For example, when the acquisition time t is "0:00:25" and the transmitting interval T is 1 min, the timing value r is "25".

In this way, a timing value is obtained for each row of the table shown in FIG. 5A. A new table (to be referred to as a timing value table hereinafter) is generated by rearranging the rows from the upper side in ascending order of timing values. FIG. 5B is a view showing a configuration example of a timing value table which is generated by using the table shown in FIG. 5A when transmitting interval T=1 min. The transmitting interval T is transmitted from the broadcast device of each channel and is used in the process.

In step S803, the difference between a timing (to be referred to as a start timing hereinafter) of starting a channel selection process (to be described later) and a timing value corresponding to a "designated segment" is obtained by referring to the timing value table generated in step S802.

The start timing can be either predetermined on the side of the broadcast receiving apparatus 100 or set by the user. The process to be described below is always the same independent of the means for setting the start timing.

The "designated segment" will be described below. As described above, the segment receiving order is determined by referring to the groups registered in the list shown in FIG. 4 in the descending order of priority. That is, the first segment which should be received is "segment 01" in FIG. 4. This is because, of the "segments to be received" (segments 01 to 04) which are defined in the group with the highest priority, the segment corresponding to the earliest partial period is segment 01. For this reason, the "designated segment" is segment 01. Hence, in step S803, the difference between the start timing and the timing value of segment 01 is obtained.

For example, assume that the start timing is "0:00:08". In this case, the remainder obtained by dividing the start timing by the transmitting interval T=1 minute is "8". In step S803, the difference between the timing value "8" and a timing value (=p) registered in the timing value table in correspondence with the segment name "01" of segment 01 is obtained. If timing value "8"<p, the difference (p−8) is obtained. If timing value "8">p, the difference {T−(8−p)} is obtained.

In step S804, it is checked whether all tables have undergone the processes in steps S801 to S803. If it is determined by the check that not all tables have undergone the processes in steps S801 to S803, the process returns to step S801 to select an unselected table and execute the subsequent process. If all tables have undergone the processes in steps S801 to S803, the process advances to step S805. In the following explanation, the set of differences obtained for the respective timing value tables by the process in steps S801 to S803 is represented by A={a1, a2, aj, . . . , aM} where aj (1≦j≦M) is a difference value obtained from a timing value table generated for a channel j.

In step S805, it is checked by referring to all elements of the set A whether it includes at least two elements having a minimum. If exist, the process advances to step S806. If no element exists, the process advances to step S807.

In step S806, the transmitting interval T is added for elements other than the element with the highest priority in the two or more elements having a minimum. For example, assume that three elements a1, a9, and a13 have a minimum. In other words, the difference value obtained from the timing value table generated for channel 1, the difference value obtained from the timing value table generated for channel 9, and the difference value obtained from the timing value table generated for channel 13 are the same and minimum among all elements included in the set A.

In the list shown in FIG. 4, each channel has a priority. In FIG. 4, channel 1 has a higher priority than channel 2. In this case, channels having the second and subsequent highest priorities are specified from channels 1, 9, and 13 by referring to the list shown in FIG. 4. Assume that channel 1 has the highest priority, and channels 9 and 13 have the second and subsequent highest priorities. In this case, the transmitting interval T is added to each of the values of a9 and a13. The element a1 is handled as a minimum element in the process in step S807 and subsequent steps. If it is determined by referring to all elements of the set A that it includes only one element having a minimum, the element is handled as a minimum element in the process in step S807 and subsequent steps, as a matter of course.

In step S807, information (channel information) that specifies a channel corresponding to the minimum element is added to a set B (the set B is an empty set when step S807 is executed for the first time). For example, when the minimum element is a5, "5" is added to the set B. The set B is represented by B={b1, b2, bj, . . . , bM} where bj (1≦j≦M) is the jth channel information added to the set B.

In step S808, the minimum element is deleted from the set A. In step S809, it is checked whether the set A is an empty set. If it is determined by the check that the set A is not an empty set, the process returns to step S805 to repeat the subsequent process.

If the set A is an empty set, the process advances to step S810.

In step S810, channel information is selected sequentially from the top of the set B. The channel selection order is determined by selecting a channel represented by each selected channel information. That is, the arrangement order of the elements b1, b2, . . . , bj, and bM of the set B is determined as the channel selection order.

In the above-described process, the sets A and B are created in the RAM 117 or a memory prepared by the channel selection order scheduling unit 202 itself. The write/read access to the sets A and B is done for the RAM 117 or the memory of the channel selection order scheduling unit 202.

FIG. 9 is a flowchart illustrating an overall process executed by the broadcast receiving apparatus 100.

In step S901, the tuner use determination unit 112 determines whether the terrestrial digital tuner unit 105 is currently usable for segment reception. If it is determined by the check in step S901 that the terrestrial digital tuner unit 105 is unusable, the process advances to step S902. If the terrestrial digital tuner unit 105 is usable, the process advances to step S906.

In step S902, the CPU 118 controls the terrestrial digital tuner unit 105 based on a channel selection designation from the remote controller 104. The terrestrial digital tuner unit 105 selects the designated channel. In step S903, the program data of 64 segments are received from the broadcast device of the selected channel. In step S904, the acquisition time of each of the received program data is recorded in a memory such as the RAM 117 together with a segment name, and the like contained in the received program data.

In step S905, the CPU 118 checks whether the channel selection designation input from the remote controller 104 is input to the signal input unit 119 again. If it is determined by the check that no designation is input, the process returns to step S901. If a designation is input, the process returns to step S903 to repeat the subsequent process.

In step S906, it is determined whether the current date/time (counted by the CPU 118) has changed. If it is determined by the check that the current date/time has not changed, the process advances to step S908. If the current date/time has changed, the process advances to step S907.

In step S907, the acquisition-expected group list management unit 205 generates a "list in which segment groups to be acquired within time range as an acquisition target are registered in the order of acquisition" as shown in FIG. 4.

In this embodiment, the program data receiving order to receive the program data of 64 segments for each channel is registered in the list generated in advance or in step S907.

In step S908, the process according to the flowchart in FIG. 8 is executed.

In step S909, the CPU 118 refers to the selection order determined in step S908 and controls the terrestrial digital tuner unit 105 to select the channel that should be selected first. Hence, the terrestrial digital tuner unit 105 can select the channel that should be selected first.

In step S910, the terrestrial digital tuner unit 105 receives the program data of 64 segments transmitted from the broadcast device of the selected channel. The process after reception has been described above. After completion of reception processing for the selected channel, information about the received program data may be deleted from the list.

In step S911, the CPU 118 checks whether all channels are selected. If it is determined by the check that all channels are selected, the process is ended. If not all channels are selected, the process advances to step S912.

In step S912, the CPU 118 refers to the selection order determined in step S908 and controls the terrestrial digital tuner unit 105 to select the channel that should be selected next. Hence, the terrestrial digital tuner unit 105 can select the channel that should be selected next. The process returns to step S910 to execute the subsequent process for the selected channel.

With above-described process, according to this embodiment, in case of receiving the program data of 64 segments from each channel, it can select the channels in such order as receiving order is early, of program data designated as target to be received first. It is therefore possible to receive the program data of 64 segments from each channel more quickly.

<Modification>

In the above description, "all program data (i.e., the program data of 64 segments) within time range as an acquisition target" are acquired for each channel independently of the presence/absence of acquired program data. Instead, only unacquired program data may be received while omitting reception of acquired program data. Unacquired program data can be specified based on the information managed by the program data management unit 201.

To receive only unacquired program data from each channel, the above-described process is modified in only the following points.

Program data registered in the list generated by the acquisition-expected group list management unit 205 are different from those described above. In the above description, a "program data receiving order to receive the program data of 64 segments for each channel" is registered in the list generated by the acquisition-expected group list management unit 205. In this modification, however, a "program data receiving order to receive unacquired program data for each channel" is registered.

The program data that should be acquired first is specified based on such the list in accordance with the same procedure as described above. Of the unacquired program data, the program data of the segment in the earliest partial period changes depending on the channel. Hence, when the process according to the flowchart in FIG. 8 is executed, the "designated segment" in step S803 changes depending on the channel. That is, the "designated segment" of each channel indicates a "segment in the earliest partial period of the unacquired segments of the channel".

In this embodiment, the descrambler 106, demultiplexer 107, decoders 108 to 110, image composition unit 111, EPG data generation unit 115, program data processing unit 114, time management unit 113, and tuner use determination unit 112 shown in FIG. 1 are formed by hardware. However, some or all of them may be implemented by software and stored in the ROM 116. In this case, when the CPU 118 executes a corresponding program, a corresponding function is implemented.

Second Embodiment

In this embodiment, a user inputs an acquisition request of the program data of segments corresponding to a specific date/time by using a remote controller 104. For example, a user designates by using the remote controller 104 to acquire program data from 18:00 to 24:00 four days after.

In this case, an acquisition-expected group list management unit 205 registers, in a table as shown in FIG. 4, segments corresponding to the requested partial period for each channel. The subsequent process is actually the same as in the first embodiment. More specifically, in the first embodiment, 64 segments are received in correspondence with each channel. In the second embodiment, segments corresponding to a partial period are received in correspondence with each channel. That is, the actual process does not change.

Third Embodiment

In the first embodiment, it is checked in step S805 by referring to all elements of the set A whether it includes at least two elements having a minimum. However, taking the time required for channel switching operation into consideration, it may be checked in step S805 whether the set A includes at least two elements having a value ranging from a minimum to minimum+α (α is an arbitrary value).

Other Embodiments

The object of the present invention is also achieved by the following method, as a matter of course. A recording medium (or storage medium) which records software program codes to implement the functions of the above-described embodiments is supplied to a system or apparatus. The computer (or CPU or MPU) of the system or apparatus reads out and executes the program codes stored in the recording medium. In this case, the program codes read out from the recording medium themselves implement the functions of the above-described embodiments. The recording medium that stores the program codes constitutes the present invention.

Alternatively, the computer executes the readout program codes, and an operating system (OS) and the like, running on the computer partially or wholly executes actual processing based on the instructions of the program codes, thereby implementing the functions of the above-described embodiments.

Assume that the program codes read out from the recording medium are written in the memory of a function expansion card inserted into the computer or a function expansion unit connected to the computer. After that, the CPU of the function expansion card or function expansion unit partially or wholly executes actual processing based on the instructions of the program codes, thereby implementing the functions of the above-described embodiments.

The recording medium to which the present invention is applied stores program codes corresponding to the above-described flowcharts.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-293155 filed Oct. 27, 2006 which is hereby incorporated by reference herein in its entirety.

What is claimed is:

1. An information receiving apparatus capable of receiving program data periodically transmitted by a segment unit for each channel of digital broadcasting, comprising:
   a storage unit that stores, into a memory, a receiving timing of program data of each segment for each channel;
   a determination unit that, by using the receiving timing of program data of each channel corresponding to a target segment designated as acquisition target, a start timing for starting a channel selection processing, and an interval at which all segments of one channel are transmitted, calculates transmitting timing of the target segment and determines a channel selection order of each channel so as to select a channel transmitting the target segment corresponding to the calculated transmitting timing at the calculated transmitting timing; and
   a receiving unit that selects each channel in the channel selection order determined by said determination unit, and receives the target segment transmitted from the selected channel.

2. The apparatus according to claim 1, wherein said determination unit comprises:
   a unit that, for each channel, calculates difference value between remainder obtained by dividing receiving timing of program data corresponding to the target segment by the interval and that obtained by dividing the start timing by the interval; and
   a unit that determines the channel selection order in accordance with the difference value calculated for each channel and program data acquisition priority preset for each channel.

3. The apparatus according to claim 1, wherein the target segment is unacquired segment, and
   said determining unit calculates the transmitting timing of a unacquired segment except for an acquired segment, and determines the channel selection order so as to select a channel transmitting the unacquired segment at this calculated transmitting timing.

4. A control method of an information receiving apparatus capable of receiving program data periodically transmitted by a segment unit for each channel of digital broadcasting, comprising:
   a storing step of storing, into a memory, a receiving timing of program data of each segment for each channel;
   a determining step of, by using the receiving timing of program data of each channel corresponding to a target segment designated as acquisition target, a start timing for starting a channel selection processing, and an interval at which all segments of one channel are transmitted, calculating transmitting timing of the target segment and determining a channel selection order of each channel so as to select a channel transmitting the target segment corresponding to the calculated transmitting timing at the calculated transmitting timing; and
   a receiving step of selecting each channel in the channel selection order determined in the determining step, and receiving the target segment transmitted from the selected channel.

5. The control method according to claim 4, wherein the determining step includes:
   a step of, for each channel, calculating difference value between remainder obtained by dividing receiving timing of program data corresponding to the target segment by the interval and that obtained by dividing the start timing by the interval; and
   a step of determining the channel selection order in accordance with the difference value calculated for each channel and program data acquisition priority preset for each channel.

6. The control method according to claim 4, wherein the target segment is unacquired segment, and
   the determining step includes a step of calculating the transmitting timing of a unacquired segment except for an acquired segment, and determining the channel selection order so as to select a channel transmitting the unacquired segment at this calculated transmitting timing.

* * * * *